(12) United States Patent
Cismas et al.

(10) Patent No.: US 12,395,642 B2
(45) Date of Patent: Aug. 19, 2025

(54) SYSTEMS AND METHODS OF RATE CONTROL FOR MULTIPLE PASS VIDEO ENCODING

(71) Applicant: Apple Inc., Cupertino, CA (US)

(72) Inventors: Sorin C Cismas, Saratoga, CA (US); Ganesh G Yadav, Fremont, CA (US)

(73) Assignee: Apple Inc., Cupertino, CA (US)

( * ) Notice: Subject to any disclaimer, the term of this patent is extended or adjusted under 35 U.S.C. 154(b) by 68 days.

(21) Appl. No.: 18/545,989

(22) Filed: Dec. 19, 2023

(65) Prior Publication Data

US 2024/0121401 A1    Apr. 11, 2024

Related U.S. Application Data

(62) Division of application No. 17/589,642, filed on Jan. 31, 2022, now Pat. No. 11,871,003.

(60) Provisional application No. 63/243,711, filed on Sep. 13, 2021.

(51) Int. Cl.
| | |
|---|---|
| *H04N 19/149* | (2014.01) |
| *H04N 19/14* | (2014.01) |
| *H04N 19/174* | (2014.01) |
| *H04N 19/186* | (2014.01) |
| *H04N 19/30* | (2014.01) |

(52) U.S. Cl.
CPC ........... *H04N 19/149* (2014.11); *H04N 19/14* (2014.11); *H04N 19/174* (2014.11); *H04N 19/186* (2014.11); *H04N 19/30* (2014.11)

(58) Field of Classification Search
CPC .... H04N 19/149; H04N 19/14; H04N 19/174; H04N 19/186; H04N 19/30
See application file for complete search history.

(56) References Cited

U.S. PATENT DOCUMENTS

| | | |
|---|---|---|
| 7,778,813 B2 | 8/2010 | Zhou |
| 2016/0234496 A1 | 8/2016 | Panda et al. |
| 2020/0105024 A1 | 4/2020 | Mammou et al. |
| 2020/0279130 A1 | 9/2020 | Vosoughi et al. |
| 2021/0160523 A1* | 5/2021 | Rapaka ................ H04N 19/109 |

FOREIGN PATENT DOCUMENTS

| | | |
|---|---|---|
| WO | 2016011796 A1 | 1/2016 |
| WO | 2021061024 A1 | 4/2021 |
| WO | 2021076091 A1 | 4/2021 |

* cited by examiner

*Primary Examiner* — Jae N Noh
(74) *Attorney, Agent, or Firm* — Fletcher Yoder, P.C.

(57) ABSTRACT

This disclosure is directed to systems and methods of rate control in multiple pass video encoding. The video encoder may complete multiple encoding passes for slices of an image. Rate control algorithms may be implemented that scale the quantization step size and quantization matrix values depending on the determined size of the image slices. This may enable the size of slices to be adjusted based on size parameters for the image data.

20 Claims, 16 Drawing Sheets

SYSTEMS AND METHODS OF RATE CONTROL FOR MULTIPLE PASS VIDEO ENCODING

CROSS-REFERENCE TO RELATED APPLICATIONS

This application is a divisional of U.S. application Ser. No. 17/589,642, entitled, "Systems and Methods of Rate Control for Multiple Pass Video Encoding," filed Jan. 31, 2022, which claims priority to U.S. Provisional Application No. 63/243,711, entitled, "Systems and Methods of Rate Control for Multiple Pass Video Encoding," filed Sep. 13, 2021, each of which is incorporated herein by reference in its entirety for all purposes.

BACKGROUND

This disclosure relates to systems and methods of rate control for multiple pass video encoding. More specifically, rate control algorithms that enable the encoder to scale quantization parameters based on subsequent encoding passes.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Numerous electronic devices—such as cellular devices, televisions, handheld devices, and notebook computers—often display images and videos on an electronic display. To do this, many electronic devices include image encoding and decoding circuitry to process compressed video data received from a data provider. As images and videos gain increasing resolution and dynamic range, the sizes of compressed video data sent to the electronic device for streaming operations has increased. The electronic device, depending on available device bandwidth, may be able to stream video data corresponding to certain resolutions at certain times. The switching of video streams depending on electronic device capability has resulted in decreased image quality and latency in video streaming.

SUMMARY

A summary of certain embodiments disclosed herein is set forth below. It should be understood that these aspects are presented to provide the reader with a brief summary of these certain embodiments and that these aspects are not intended to limit the scope of this disclosure.

Lossy video compression standards (e.g., ProRes) may be utilized to preserve large quantities of image data within a system by using quantization of video data, and introducing distortion. In lossy video compression although the data recovered may be perceptually lossless, it is never exact or lossless in terms of bits recovered. Lossy video compression standards may also be implemented for streaming large quantities of video data. Some devices, however, may not have the bandwidth to transfer the large quantities of video data necessary for video streaming Streaming applications over networks may have a variety of bitrate profiles corresponding to the resolution of the receiving devices (e.g., 1 megabit per second for low resolution, 4-5 megabits per second for high resolution, 10 megabits per second for higher resolution). The receiver device may need to modify video data sent to the device, depending on the bandwidth the receiving device has available. Video data may be sent in multiple streams that each correspond to different resolutions (e.g., low resolution=standard definition at 30 frames per second (fps), high resolution=high definition 1920×1080 progressively displayed pixels at 30 fps, higher resolution=ultra-high definition 3840×2160 progressively displayed pixels at 50 fps, bitrates representative of HEVC encoded bitstreams and AOMedia Video 1 (AV1), Versatile Video Coding (VVC) standards target 70% of the bitrates of HEVC), and the receiver device may select a stream based on the acceptable device bandwidth. This may introduce latency into the video processing, as the receiver may need to synchronize to different streams based on available bandwidth, and may need to switch over from one stream to another depending on immediate device bandwidth.

Thus, embodiments herein provide various systems and methods to reduce latency and inefficiencies in video streaming. To do so, embodiments disclosed herein include partitioning video data into one or more layers corresponding to image slices. The video data that is partitioned may be sent to a receiving device in a single stream of video data. The sending device may determine the bandwidth of the receiving device, and may drop layers from the single stream depending on the available bandwidth of the receiving device. This enables the receiving device to receive a single stream of data, and encode the coefficients in each layer of the single stream. The receiving device may include a muxer that may receive all the encoded layers, and then may send the encoded layers to a demuxer that may combine the layers into a bitstream for decoding. The decoder of the receiving device may then decode the bitstream. This method enables real-time control of video data sent to the receiving device, and reduces latency by sending the layered data within a single stream.

Additionally, the video encoder may utilize multiple counters for the header, luma, and chroma components during encoding for every partition of the image slice. The slice of Y'CbCr image data received by the video encoder may be partitioned into multiple layers. The video encoder may first encode the slice without partitioning, and then may utilize the multiple counters when encoding every partition. The counters may be able to keep track of the header, luma, and chroma bits utilized for every layer within the slice. The counters may start with a run (e.g., zero-element) and end with the last non-zero element within the layers. The encoded layers may then be assembled into a single slice before the layers are sent to a core for decoding. The header may be constructed based on all the layer headers, and the scanned coefficients may be concatenated for all layers for each component.

BRIEF DESCRIPTION OF THE DRAWINGS

Various aspects of this disclosure may be better understood upon reading the following detailed description and upon reference to the drawings described below.

DETAILED DESCRIPTION

Figure 1:
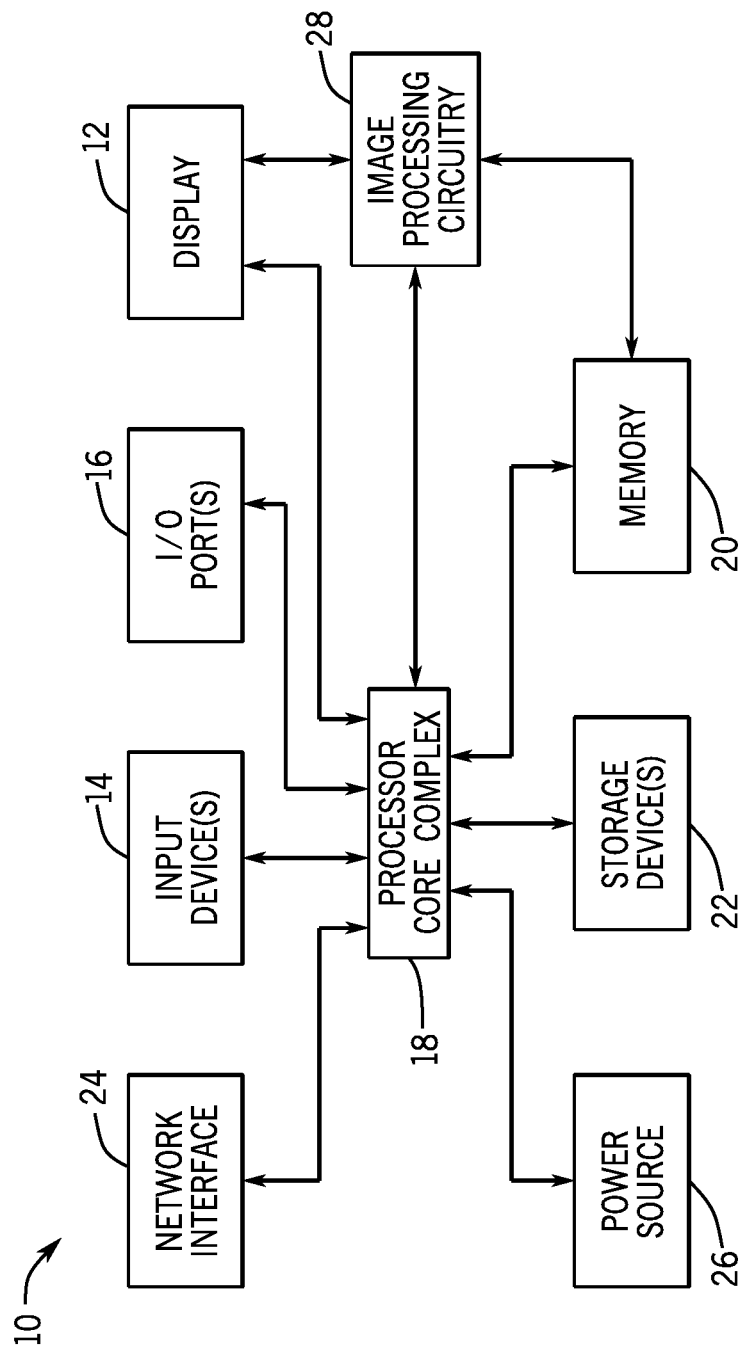
FIG. 1 is a block diagram of an electronic device with an electronic display, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "including" and "having" are intended to be inclusive and mean that there may be additional elements other than the listed elements. Additionally, it should be understood that references to "some embodiments," "embodiments," "one embodiment," or "an embodiment" of the present disclosure are not intended to be interpreted as excluding the existence of additional embodiments that also incorporate the recited features. Furthermore, the phrase A "based on" B is intended to mean that A is at least partially based on B. Moreover, the term "or" is intended to be inclusive (e.g., logical OR) and not exclusive (e.g., logical XOR). In other words, the phrase A "or" B is intended to mean A, B, or both A and B.

This disclosure relates to lossy video compression standards that may be implemented for streaming large quantities of video data. Some devices, however, may not have the bandwidth to transfer the large quantities of video data necessary for video streaming Streaming applications over networks may have a variety of bitrate profiles corresponding to the resolution of the receiving devices (e.g., 1 megabit per second for low resolution, 4-5 megabits per second for high resolution, 10 megabits per second for higher resolution). The receiver device may need to modify video data sent to the device, depending on the bandwidth the receiving device has available. Video data may be sent in multiple streams that each correspond to different resolutions, and the receiver device may select a stream based on the acceptable device bandwidth. This may introduce latency into the video processing, as the receiving device may need to synchronize to stream based on available bandwidth, and may need to switch over from one stream to another depending on bandwidth available.

Thus, embodiments herein provide various systems and methods to reduce latency and inefficiencies in video streaming. To do so, embodiments disclosed herein include rate control methods for multiple pass encoding. The rate control methods may include scaling quantization parameters corresponding to slices of video data based on subsequent passes collected statistics. The rate control may employ 3-pass rate control, fixed or adaptive quantization matrix and adaptive deadzone rounding matrix selection, and coefficient masking. The rate control may also employ two pass rate control and perform quantization step size adjustment and determine maximum slice sizes without the second pass statistics. The second pass rate control may employ firmware or statistical methods to determine the quantization size adjustment that should be implemented for the image slices that are encoded during the second pass.

Additionally, the rate control may enable the encoder to ensure a minimum compression ratio for image slices without affecting the quality of the encoded image slices. The encoder may set minimum quantization step to enable a minimum compression ratio to be set, and guarantee a certain image quality. The encoder may also determine a maximum slice size for the encoded images, and adjust the quantization step size to set the compression ratio to enable a high throughput.

Additionally, embodiments disclosed herein include streaming extensions that may define modifications to the bitstream syntax. These modifications may enable coding of syntax elements within a stream to a lower latency. The streaming extension bitstream syntax may include tile syntax that may identify encoded layers within the stream, and the position of the tile and size of the tile within the image frame. The slice syntax may be modified to accommodate the streaming extensions, to minimize the overhead between slices and layers. The alignment between the layers may be concatenated on the bit-boundary rather than the byte boundary to enable increased granularity in image encoding, and to minimize overhead between different elements within the layers. Additionally, the scanned coefficients within the layers may be aligned on bit-boundaries. The syntax may enable up to 16 pairs of quantization matrices to be used during encoding to enable adaptive quantization, rounding matrices, and coefficient masking.

Further, embodiments disclosed herein include partitioning video data into layers corresponding to different bandwidths that are sent to a receiving device as a single stream of image data. The sending device may determine the bandwidth of the receiving device, and may drop layers from the stream depending on the available bandwidth of the receiving device. This enables the receiving device to receive a single stream of data, encode the coefficients, a muxer may then receive all the layers and sends the layers individually to a demuxer that combines the layers into a single stream, and then a decoder may decode the single stream. This method enables real-time control of video data sent to a receiver device, and reduces latency due to the single stream approach of sending the layered data in a single stream.

Additionally, the video encoder may utilize multiple counters for the header, luma, and chroma components during encoding for every partition of the slice of image data. The slice of Y'CbCr image data received by the video encoder may be partitioned into multiple layers. The video encoder may first encode the slice without partitioning, and then may utilize the multiple counters when encoding every partition. The counters may be able to keep track of the header, luma, and chroma bits utilized for every layer within the slice. The counters may start with a run and end with the last non-zero element within the layers. The encoded layers may then be assembled into a single slice before the layers are sent to a core for decoding. The header may be constructed based on all the layer headers, and the scanned coefficients may be concatenated for all layers for each component.

Keeping the foregoing in mind, an electronic device 10 including an electronic display 12 (e.g., display device) is shown in FIG. 1. As is described in more detail below, the electronic device 10 may be any suitable electronic device, such as a computer, a mobile phone, a portable media device, a tablet, a television, a virtual-reality headset, a vehicle dashboard, and the like. Thus, it should be noted that FIG. 1 is merely one example of a particular implementation and is intended to illustrate the types of components that may be present in an electronic device 10.

The electronic display 12 may be any suitable electronic display. For example, the electronic display 12 may include a self-emissive pixel array having an array of one or more of self-emissive pixels. The electronic display 12 may include any suitable circuitry to drive the self-emissive pixels, including for example row driver and/or column drivers (e.g., display drivers). Each of the self-emissive pixels may include any suitable light emitting element, such as a LED, one example of which is an OLED. However, any other suitable type of pixel, including non-self-emissive pixels (e.g., liquid crystal as used in liquid crystal displays (LCDs), digital micromirror devices (DMD) used in DMD displays) may also be used.

In the depicted embodiment, the electronic device 10 includes the electronic display 12, one or more input devices 14, one or more input/output (I/O) ports 16, a processor core complex 18 having one or more processor(s) or processor cores, local memory 20, a main memory storage device 22, a network interface 24, a power source 26 (e.g., power supply), and image processing circuitry 28. The various components described in FIG. 1 may include hardware elements (e.g., circuitry), software elements (e.g., a tangible, non-transitory computer-readable medium storing instructions), or a combination of both hardware and software elements. It should be noted that the various depicted components may be combined into fewer components or separated into additional components. For example, the local memory 20 and the main memory storage device 22 may be included in a single component. The image processing circuitry 28 (e.g., a graphics processing unit) may be included in the processor core complex 18.

The processor core complex 18 may execute instruction stored in local memory 20 and/or the main memory storage device 22 to perform operations, such as generating and/or transmitting image data. As such, the processor core complex 18 may include one or more general purpose microprocessors, one or more application specific integrated circuits (ASICs), one or more field programmable logic arrays (FPGAs), or any combination thereof.

In addition to instructions, the local memory 20 and/or the main memory storage device 22 may store data to be processed by the processor core complex 18. Thus, the local memory 20 and/or the main memory storage device 22 may include one or more tangible, non-transitory, computer-readable mediums. For example, the local memory 20 may include random access memory (RAM) and the main memory storage device 22 may include read-only memory (ROM), rewritable non-volatile memory such as flash memory, hard drives, optical discs, and/or the like.

The network interface 24 may communicate data with another electronic device and/or a network. For example, the network interface 24 (e.g., a radio frequency system) may enable the electronic device 10 to communicatively couple to a personal area network (PAN), such as a Bluetooth network, a local area network (LAN), such as an 1622.11x Wi-Fi network, and/or a wide area network (WAN), such as a 4G or Long-Term Evolution (LTE) cellular network.

The processor core complex 18 is operably coupled to the power source 26. The power source 26 may provide electrical power to one or more components in the electronic device 10, such as the processor core complex 18 and/or the electronic display 12. Thus, the power source 26 may include any suitable source of energy, such as a rechargeable lithium polymer (Li-poly) battery and/or an alternating current (AC) power converter.

The processor core complex 18 is operably coupled with the one or more I/O ports 16. The I/O ports 16 may enable the electronic device 10 to interface with other electronic devices. For example, when a portable storage device is connected, the I/O port 16 may enable the processor core complex 18 to communicate data with the portable storage device.

The electronic device 10 is also operably coupled with the one or more input devices 14. The input device 14 may enable user interaction with the electronic device 10, for example, by receiving user inputs via a button, a keyboard, a mouse, a trackpad, and/or the like. The input device 14 may include touch-sensing components in the electronic display 12. The touch-sensing components may receive user inputs by detecting occurrence and/or position of an object touching the surface of the electronic display 12.

In addition to enabling user inputs, the electronic display 12 may include one or more display panels. Each display panel may be a separate display device or one or more display panels may be combined into a same device. The electronic display 12 may control light emission from the display pixels to present visual representations of information, such as a graphical user interface (GUI) of an operating system, an application interface, a still image, or video content, by displaying frames based on corresponding image data. As depicted, the electronic display 12 is operably coupled to the processor core complex 18 and the image processing circuitry 28. In this manner, the electronic display 12 may display frames based on image data generated by the processor core complex 18 and/or the image processing circuitry 28. Additionally or alternatively, the electronic display 12 may display frames based on image data received via the network interface 24, an input device 14, an I/O port 16, or the like.

Figure 2:
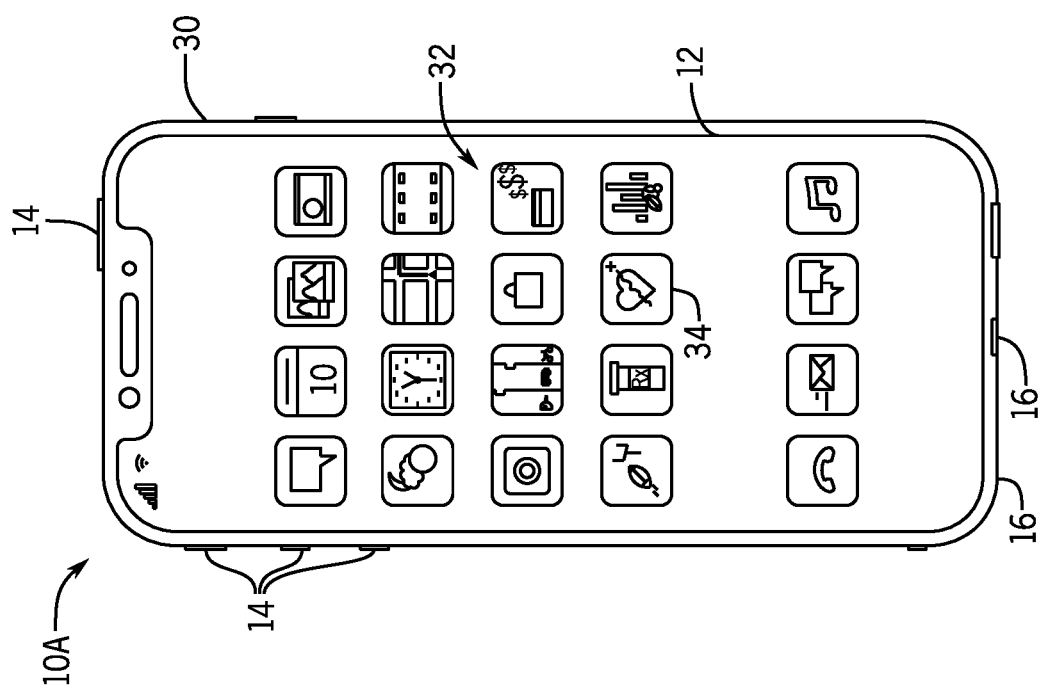
FIG. 2 is an example of the electronic device of FIG. 1, in accordance with an embodiment.

As described above, the electronic device 10 may be any suitable electronic device. To help illustrate, an example of the electronic device 10, a handheld device 10A, is shown in FIG. 2. The handheld device 10A may be a portable phone, a media player, a personal data organizer, a handheld game platform, and/or the like. For illustrative purposes, the handheld device 10A may be a smart phone, such as any IPHONE® model available from Apple Inc.

The handheld device 10A includes an enclosure 30 (e.g., housing). The enclosure 30 may protect interior components from physical damage and/or shield them from electromagnetic interference, such as by surrounding the electronic display 12. The electronic display 12 may display a graphical user interface (GUI) 32 having an array of icons. When an icon 34 is selected either by an input device 14 or a touch-sensing component of the electronic display 12, an application program may launch.

The input devices 14 may be accessed through openings in the enclosure 30. The input devices 14 may enable a user to interact with the handheld device 10A. For example, the input devices 14 may enable the user to activate or deactivate the handheld device 10A, navigate a user interface to a home screen, navigate a user interface to a user-configurable application screen, activate a voice-recognition feature, provide volume control, and/or toggle between vibrate and ring modes. The I/O ports 16 may be accessed through openings in the enclosure 30 and may include, for example, an audio jack to connect to external devices.

Figure 3:
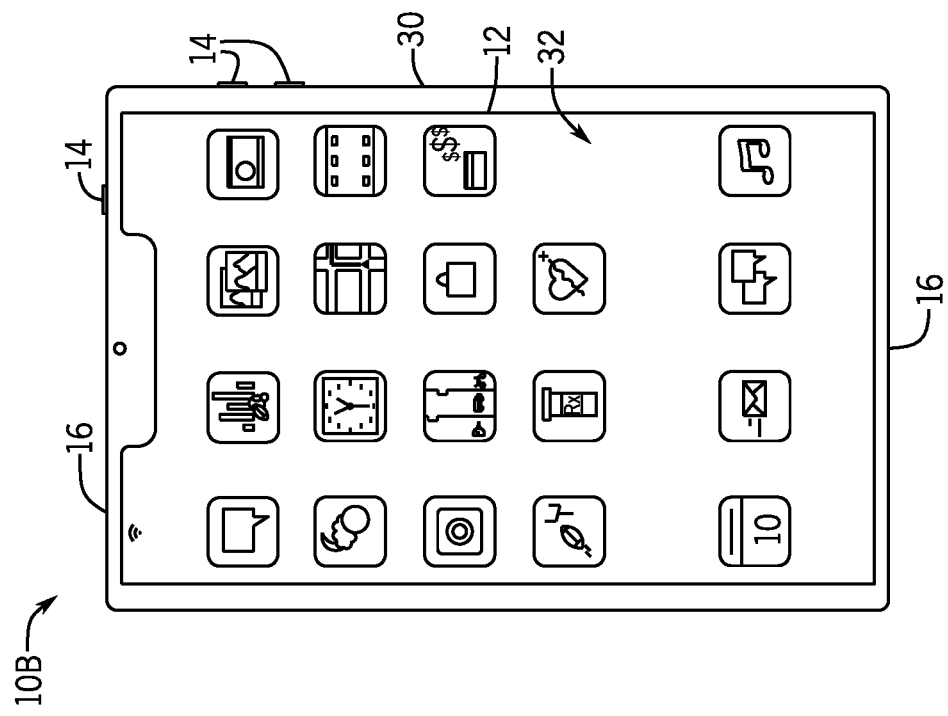
FIG. 3 is another example of the electronic device of FIG. 1, in accordance with an embodiment.
Figure 4:
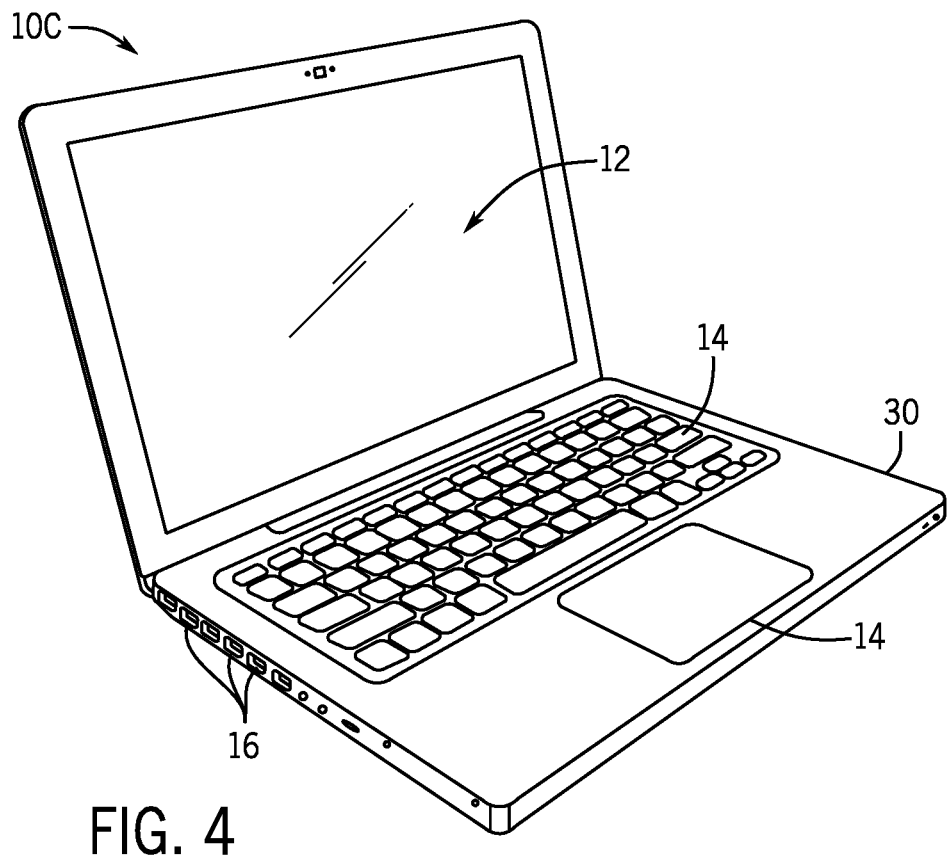
FIG. 4 is another example of the electronic device of FIG. 1, in accordance with an embodiment.
Figure 5:
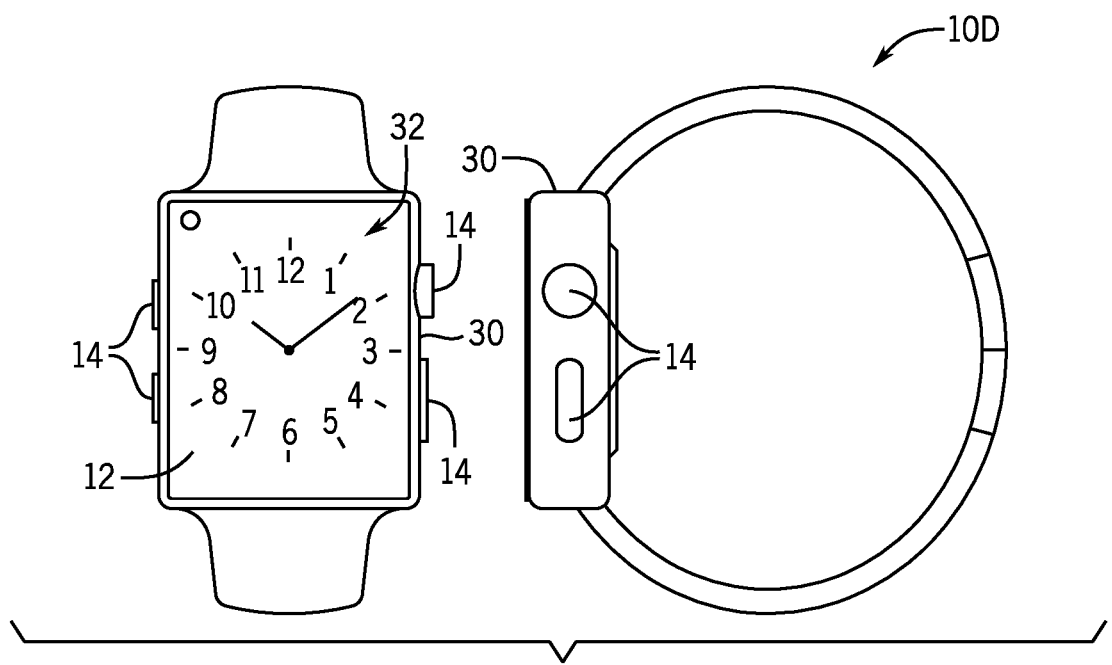
FIG. 5 is another example of the electronic device of FIG. 1, in accordance with an embodiment.

Another example of a suitable electronic device 10, specifically a tablet device 10B, is shown in FIG. 3. The tablet device 10B may be any IPAD® model available from Apple Inc. A further example of a suitable electronic device 10, specifically a computer 10C, is shown in FIG. 4. For illustrative purposes, the computer 10C may be any MACBOOK® or IMAC® model available from Apple Inc. Another example of a suitable electronic device 10, specifically a watch 10D, is shown in FIG. 5. For illustrative purposes, the watch 10D may be any APPLE WATCH® model available from Apple Inc. As depicted, the tablet device 10B, the computer 10C, and the watch 10D each also includes an electronic display 12, input devices 14, I/O ports 16, and an enclosure 30. The electronic display 12 may display a GUI 32. Here, the GUI 32 shows a visualization of a clock. When the visualization is selected either by the input device 14 or a touch-sensing component of the electronic display 12, an application program may launch, such as to transition the GUI 32 to presenting the icons 34 discussed in FIGS. 2 and 3.

The electronic device 10 may initially receive video stream data corresponding to lossy video compression standards. The video stream data may be received and encoded by a video encoder of the electronic device 10. The video stream data may include data that has been partitioned into layers corresponding to available device bandwidth. The video encoder may encode slices of the video data using data partitioning to encode the layers of video stream data received. In some embodiments, the image processing circuitry 28 processes images and/or videos, performs encoding (e.g., high-throughput encoding) and/or decoding functionality, communicates with one or more displays, reads and writes compressed data and/or bitstreams, and the like.

Figure 6:
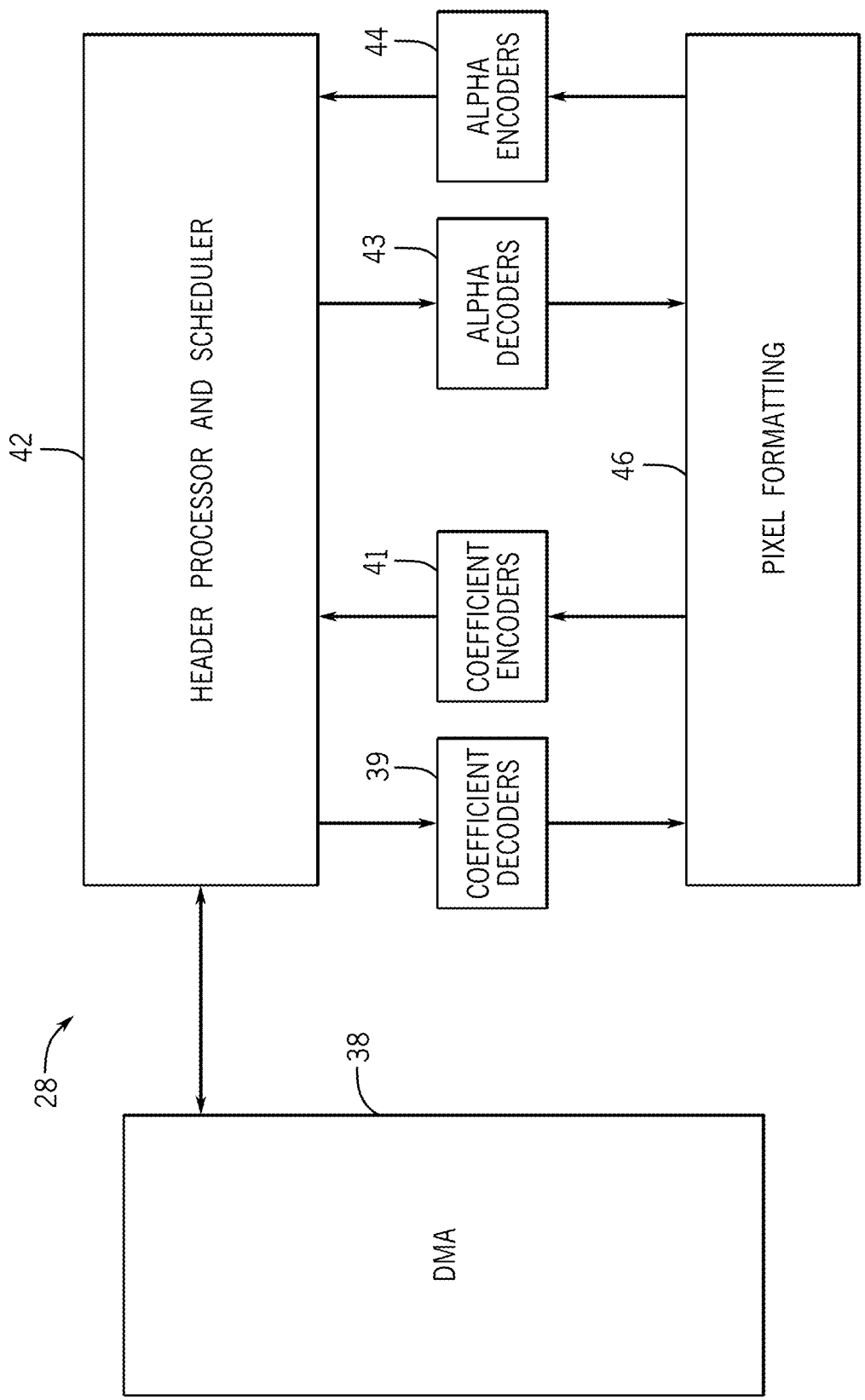
FIG. 6 is a schematic diagram of image processing circuitry, in accordance with an embodiment.

With the foregoing in mind FIG. 6 is a schematic diagram of image processing circuitry 28, in accordance with an embodiment of the present disclosure. The image processing circuitry 28 may in some embodiments process images and/or videos, perform high throughput encoding and decoding functionality, communicate with one or more displays, read and write compressed data and/or bitstreams, and the like. The image processing circuitry 28 includes a header processor and scheduler 42 that may schedule video data received from the direct memory access (DMA) 38 to the multiple coefficient decoders 39 and multiple alpha decoders 43. The DMA 38 may also receive encoded image data from the multiple coefficient encoders 42 and the multiple alpha encoders 44. The pixel formatting component 46 may receive pixel data from the multiple coefficient decoders 39 and the multiple alpha decoders 43 and send the pixel data to the multiple coefficient encoders 41 and the multiple alpha encoders 44. In some embodiments there may be 16 coefficient decoders 39 and four alpha decoders 43, and 16 coefficient encoders 41 and four alpha encoders 44. It should be understood, that any suitable number of coefficient encoders/decoders and alpha encoders/decoders may be implemented.

Figure 7:
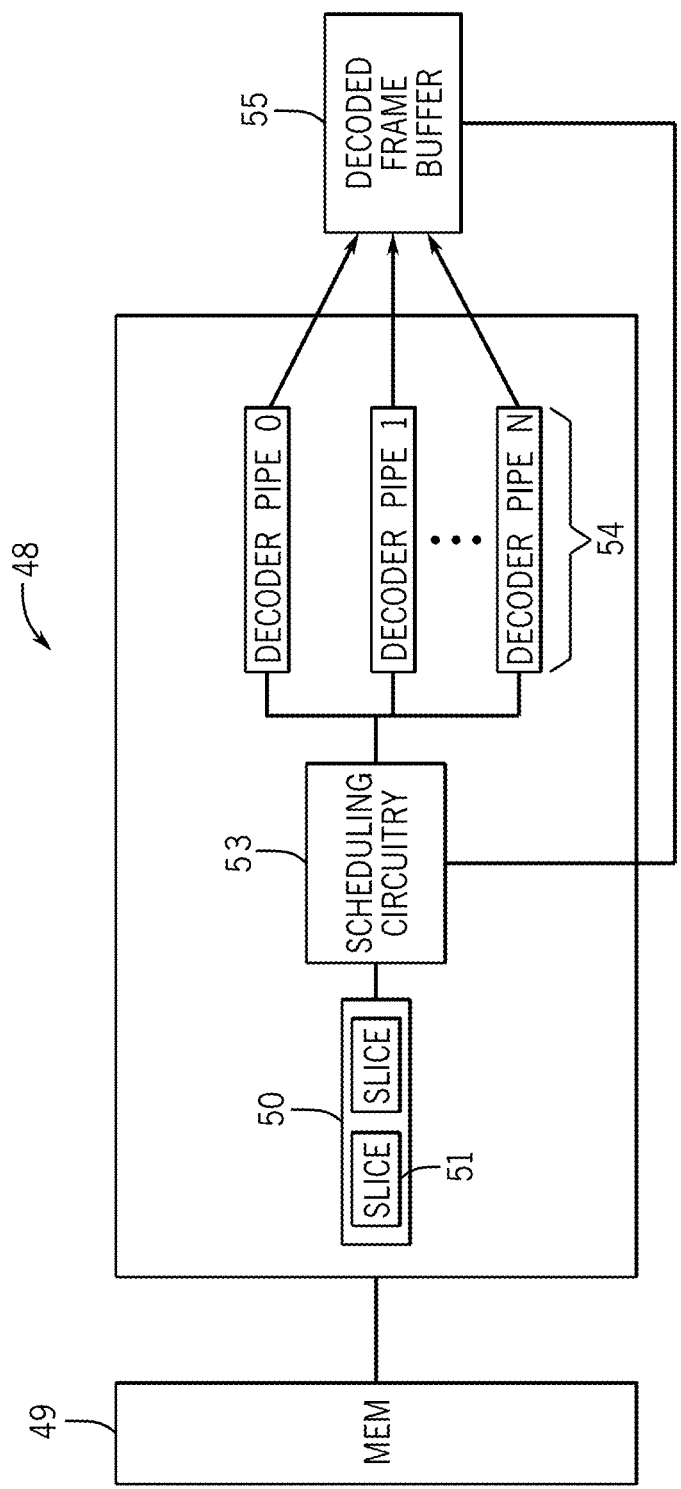
FIG. 7 is a schematic diagram of decoder pipeline circuitry, in accordance with an embodiment.

With the foregoing in mind FIG. 7 is a schematic diagram of decoder circuitry for multiple decoder pipelines 54 of the electronic device of FIG. 1, in accordance with an embodiment of the present disclosure. The image processing circuitry 28 may include scheduling circuitry 53 that is able to schedule each of the compressed slices 51 of the bitstream 50 to one or more of the multiple decoder pipelines 54.

The multiple decoder pipelines 54 may receive compressed slices 51 from a memory 49 that are in the bitstream 50 and process each compressed slice 51 in the bitstream 50 to reconstruct the image frame from the encoded bitstream 50 data. The decoder pipelines 54 may be able to process the encoded bitstream data and produce decompressed frame data as a result of completing the decoding process. The number of decoder pipelines 54 may be any suitable number for efficient processing of the bitstream 50. For example, the number of decoder pipelines 54 may be 16 (e.g., decoder 0-15) or any other suitable number.

The decoder pipelines 54 may complete an entropy decoding process that is applied to the compressed video components of the slice 51 to produce arrays of scanned color component quantized discrete cosine transform (DCT) coefficients. The bitstream may also include an encoded alpha channel, and the entropy decoding may produce an array of raster-scanned alpha values. The one or more compressed slices 51 received at the multiple decoders pipelines 54 may include entropy-coded arrays of scanned quantized DCT coefficients that correspond to each luma and chroma color component (e.g., Y', Cb, Cr) that is included in the image frame. The quantized DC coefficients may be encoded differentially and the AC coefficients may be run-length encoded. Both the DC coefficients and the AC coefficients utilize variable-length coding (VLC) and are encoded using context adaptation. This results in some DC/AC coefficients being shorter in length and some being longer in length, such that processing time variability is present due to differences during context adaptation. This leads some portions of the bitstream 50 to include smaller DC/AC coefficients due to VLC that may process faster than other portions of the bitstream 50 due to variability in the DC/AC coefficients in the compressed slice 51.

The multiple decoder pipelines 54 may carry out multiple processing steps to reconstruct the image from the compressed slices 51 in the bitstream 50. The multiple decoder pipelines 54 may include an entropy decoding process, as discussed above that is applied to video components of the compressed slice 51. The entropy decoding produces arrays of scanned color component quantized DCT coefficients and may also produce an array of raster-scanned alpha values if the bitstream 50 includes an encoded alpha channel. The decoding process may then apply an inverse scanning process to each of the scanned color component quantized DCT coefficients to product blocks of color component DCT coefficients. The decoding process may then include an inverse quantization process that enables each of the color component quantized DCT coefficients blocks to produce blocks of color component DCT coefficients. The decoding process may conclude with each of the reconstructed color component values being converted to integral samples (e.g., pixel component samples) of desired bit depth and sending the integral samples from the decoder pipeline 54 to the decoded frame buffer 55.

Figure 8:
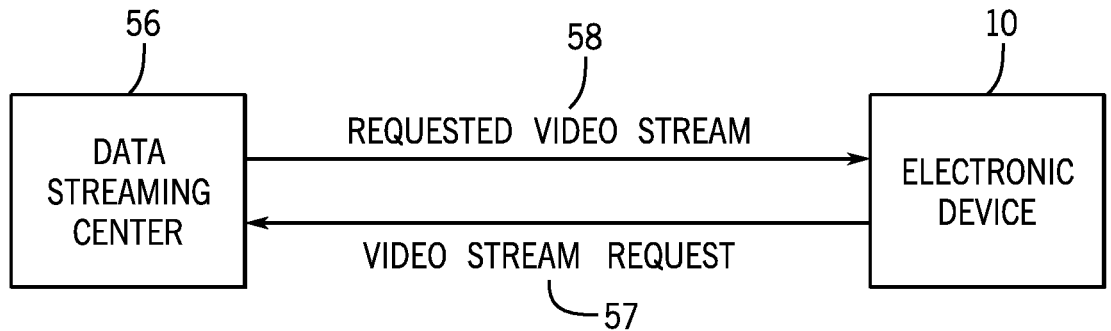
FIG. 8 is a schematic diagram of video data transfer, in accordance with an embodiment.

With the foregoing in mind, FIG. 8 is a schematic diagram of video data transfer between a data streaming center 56 and the electronic device 10. The data streaming center 56 may receive a video streaming request 57 from the electronic device 10, and may send the requested video stream data 58 to the electronic device 10 depending on the available electronic device 10 bandwidth. The data streaming center 56 may buffer the video stream data and send a single video stream to the electronic device 10 that includes one or more layers of video data. Which layers are sent within the single stream of video data may be based upon the immediate bandwidth of the electronic device 10. It should be understood that the data streaming center 56 may connect to the electronic device 10 via any suitable network interface connection (e.g., wired or wireless LAN, PAN, or WAN, a peer-to-peer connection, an Internet connection via a central server, etc.). The data streaming center 56 may be part of a home network, part of a server network, or any other suitable network. Data streaming center 56 may be an electronic device as described above with respect to electronic device 10, such as a mobile device.

The requested video stream data 58 may be sent to the electronic device 10 within a single stream. The single stream may contain multiple layers of the requested video stream data 58. The layers within the single stream may be able to construct high resolution content if more layers are sent or may be able to construct low resolution content if less layers are sent. The layers sent within the single video stream may vary according to the available bandwidth of the electronic device 10. The electronic device 10 may be a mobile device, laptop, television, or any other suitable streaming device. The data streaming center 56 may first send a base layer of the single stream to the electronic device 10 that includes all DC coefficients for the image. This enables some input data to be provided to the electronic device 10 in the form of the base layer when the electronic device 10 has low bandwidth availability. The data streaming center 56 may then send other layers within the single stream based on the available bandwidth of the electronic device 10, to increase the resolution of the image associated with the stream.

For example, a video stream may be divided into 9 layers each corresponding to a megabit. The electronic device 10 may send an indication that 9 megabits per second of bandwidth is available, and the data streaming center 56 may send all 9 layers of video data within a single video stream to the electronic device 10. The data streaming center 56 may include a processor that performs a control layer algorithm that can receive the available electronic device 10 bandwidth and determine if layers of the single stream need to be dropped from the video data stream sent to the electronic device 10 based on available bandwidth. The ability for requested video stream data 58 to include multiple layers corresponding to different device bandwidths within a single stream enables real-time and low latency control of video stream data based on available device bandwidth.

Figure 9:
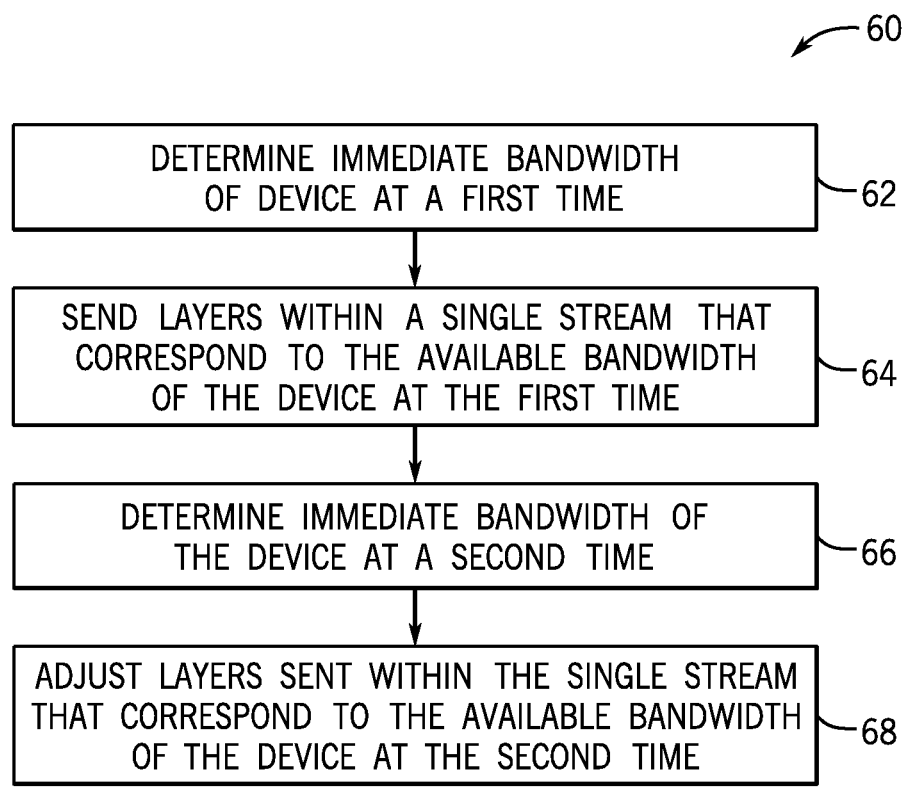
FIG. 9 is a flow diagram of a method of video data transfer based on available bandwidth of receiving device, in accordance with an embodiment.

With the foregoing in mind, FIG. 9 is a flowchart of a method 60 of video stream transmission based on available bandwidth of a receiving device, in accordance with an embodiment. A data streaming center 56 may be able to receive an available bandwidth of a receiving device (e.g., electronic device 10), and transmit layers within a single stream that correspond to the available bandwidth of the electronic device 10. The data streaming center 56 may be able to drop off layers in real time at a buffering component depending on the immediate bandwidth of the electronic device 10.

Any suitable device of the data streaming center 56, such as a processor may perform the method 60. In some embodiments, the method 60 may be implemented by executing instructions stored in a tangible, non-transitory, computer-readable medium, such as the memory (e.g., DMA), using the processor. For example, the method 60 may be performed at least in part by one or more software components, such as an operating system, one or more software applications of the data streaming center 56, and the like. While the method 60 is described using steps in a specific sequence, it should be understood that the present disclosure contemplates that the described steps may be performed in different sequences than the sequence illustrated, and certain described steps may be skipped or not performed altogether.

In block 62, the data streaming center 56 may determine the immediate bandwidth of the electronic device 10 at a first time. The electronic device 10 may be requesting to stream a video corresponding to video data provided by the data streaming center 56. The data streaming center 56 may determine the immediate bandwidth of the electronic device 10, in response to receiving the video streaming request. The immediate bandwidth may correspond to the resolution of the video stream that may be sent to the electronic device 10. For example, 1 megabit per second may correspond to a low resolution, 4-5 megabits per second may correspond to a high resolution, and 10 megabits per second may correspond to a higher resolution.

The data streaming center 56, at block 64, may then determine, based on the immediate bandwidth of the electronic device 10, the one or more layers within the single stream that may be sent to the electronic device 10. The layers sent may correspond directly to the determined immediate bandwidth of the electronic device 10. For example, the electronic device 10 may have an immediate available bandwidth of 5 megabits per second. The single video stream corresponding to the requested streaming content may be divided into 9 layers each corresponding to 1 megabit, though it should be understood that any suitable megabit size per layer may be implemented. The data streaming center 56 may send the single stream with layers 0-4 and drop off the remaining layers within the stream based on the bandwidth available. The data streaming center 56 may constantly buffer the video stream data and remove or add layers based on changes to the changes in electronic device 10 bandwidth. For example, at block 66, the data streaming center 56 may determine that the available electronic device 10 bandwidth has increased to 9 megabits per second. The processor of the data streaming center 56, at block 68, may then send all 9 layers (e.g., layers 0-8) within the single stream based on the increase in available bandwidth. It should be understood, that the data streaming center 56 may monitor and adjust the layers sent within the single stream in real-time based on the immediate bandwidth of the receiving device over time. This enables low-latency, real-time control over the video stream data sent to the electronic device 10.

The video stream data received by the electronic device 10 may be encoded by the video encoder using multiple counters corresponding to bit quantities needed to encode each layer of the video stream. The counters may correspond to the header component, the luma component and the Chroma (e.g., Cb and Cr) components of the Y'CbCr compressed video data. The video encoder may receive the video stream data and encode the video stream data received using the multiple counters, to enable data partitioning during image encoding.

Figure 10:
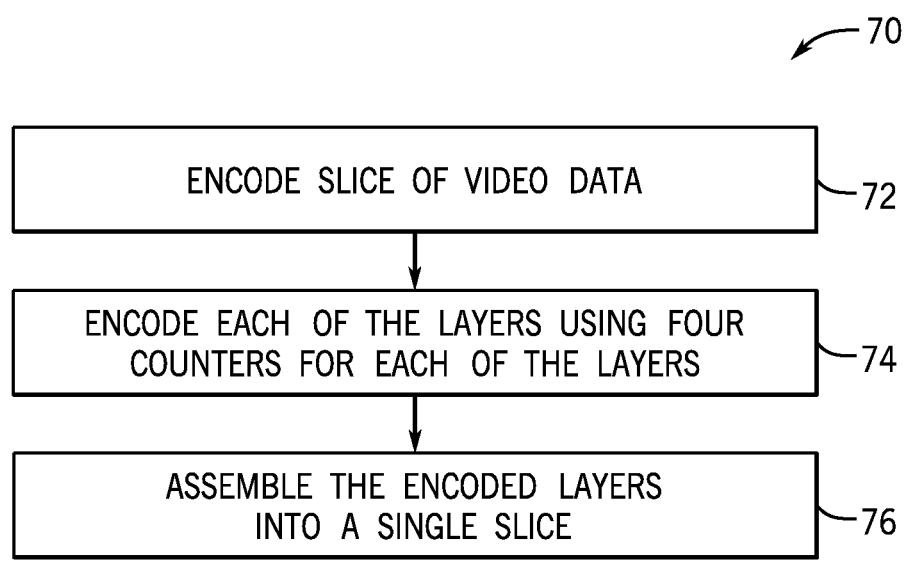
FIG. 10 is a flow diagram of a method of data partitioning for video encoding, in accordance with an embodiment.

With the foregoing in mind, FIG. 10 is a flowchart of a method 70 of data partitioning in video stream encoding, in accordance with an embodiment. A video encoder may receive video stream data corresponding to one or more layers and encode the video stream data via data partitioning based on the one or more layers. The video encoder may implement one or more counters to count the bits corresponding to the header, luma, and chroma components of the video stream data.

Any suitable device (e.g., the microcontroller 52) that may control components of the video encoder, such as the processor 18 (e.g., processor core complex 18), may perform the method 70. In some embodiments, the method 60 may be implemented by executing instructions stored in a tangible, non-transitory, computer-readable medium, such as the memory (e.g., DMA 38), using the processor core complex 18. For example, the method 70 may be performed at least in part by one or more software components, such as an operating system of the video stream provider, one or more software applications of the video stream provider, and the like. While the method 70 is described using steps in a specific sequence, it should be understood that the present disclosure contemplates that the described steps may be performed in different sequences than the sequence illustrated, and certain described steps may be skipped or not performed altogether.

In block 72, the video encoder may first encode a slice of video data without data partitioning. During the encoding process, at block 74, the video encoder may use four counters for every partition (e.g., layer) of the video data. For example, if the video stream data was partitioned into 9 layers, 36 counters would be needed for encoding the 9 partitions. It should be understood that the data may correspond to any number of partitions, and four counters will be implemented for each partition.

At block 74, the video encoder may encode each layer by implementing four counters for each of the layers. The four counters correspond to header bit counters, luma bit counters, and the two chroma bit counters (e.g., Cb and Cr counters). The headers and the content of the header counters are determined only after the layer has been encoded. The header counters are 6 bits wide (e.g., values of 16 to 56) and the other counters (e.g., luma bit and chroma bit counters) are 16 bits wide. The base layer counters may begin counting at the start of the slice and stop at the last non-zero syntax element within the slice layer. All other counters may start with a run (e.g., a zero element) and end with the last non-zero element within the layer. At block 76, the video encoder may enable the encoded layers to be assembled into a single slice before being sent off to a core for decoding. A new header may be constructed based on all the layer headers and the syntax structure may be generated for the encoded single slice.

Figure 11:
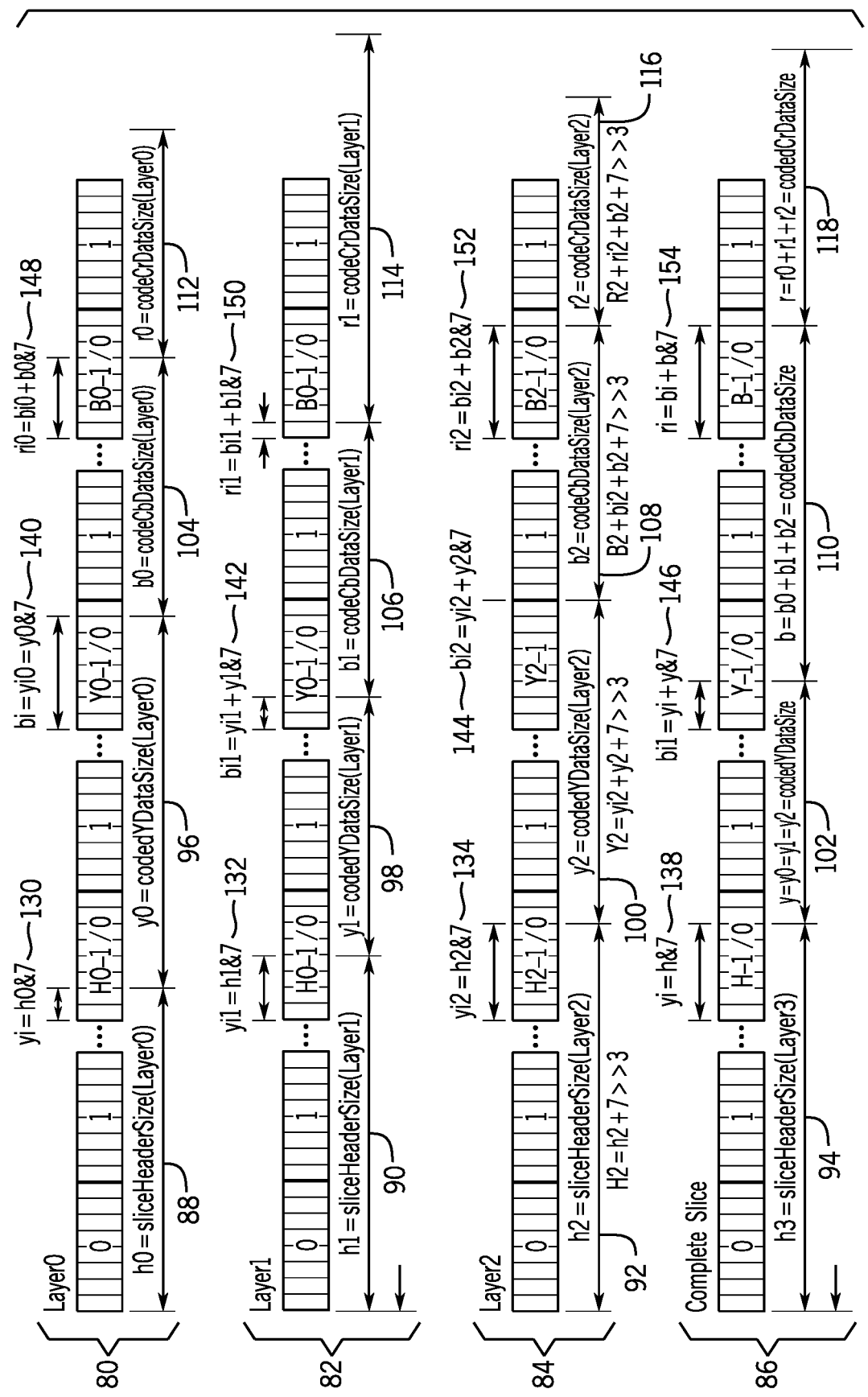
FIG. 11 is a schematic diagram of a slice of image data partitioned in three layers, in accordance with an embodiment.

With the foregoing in mind, FIG. 11 is a schematic diagram of a slice partitioned into three layers, in accordance with an embodiment of the present disclosure. The slice may be encoded and use four counters for each partition. Each layer includes a header bit counter (e.g., h[0-8]) 88, 90, 92, 94, a luma bit counter (e.g., y[0-8]) 96, 98, 100, 102, a Cb bit counter (e.g., b[0-8]) 104, 106, 108, 110, and a Cr bit counter (e.g., r[0-8]) 112, 114, 116, 118. The initial bit offset for each layer component may also be counted within the first luma bits (e.g., yi[0-8]) 130, 132, 134, 138, Cb bits (e.g., bi[0-8]) 140, 142, 144, 146, and Cr bits (e.g., ri[0-8]) 148, 150, 152, 154. The number of bits that actually contain the luma, Cr, and Cb bits may be calculated. The headers and the content of the header counters 88, 90, 92, 94 for each slice may be determined after the layer has been encoded (e.g., only after the layer has been encoded). The counting process is performed for each layer of the slice, and then for the complete slice.

As discussed above, base layer 80 counters initiate at the beginning of the slice and stop at the last non-zero syntax element within the slice to establish the first slice layer. All other counters may start with a run (e.g., zero element) and end with the last non-zero element within the layer. For example, if the slice is partitioned in three layers the counters corresponding to layer one 82 and layer two 84 may start with a run and end with the last non-zero element in the layer. In some layers all coefficients within the layer may be zero, in this case the counter may be zero and the run will be included with the next non-zero level, and added before the next non-zero level. The encoded layers are then used to form a complete slice 86 that can be sent to a core of the image processing circuitry 28 for decoding.

Figure 12:
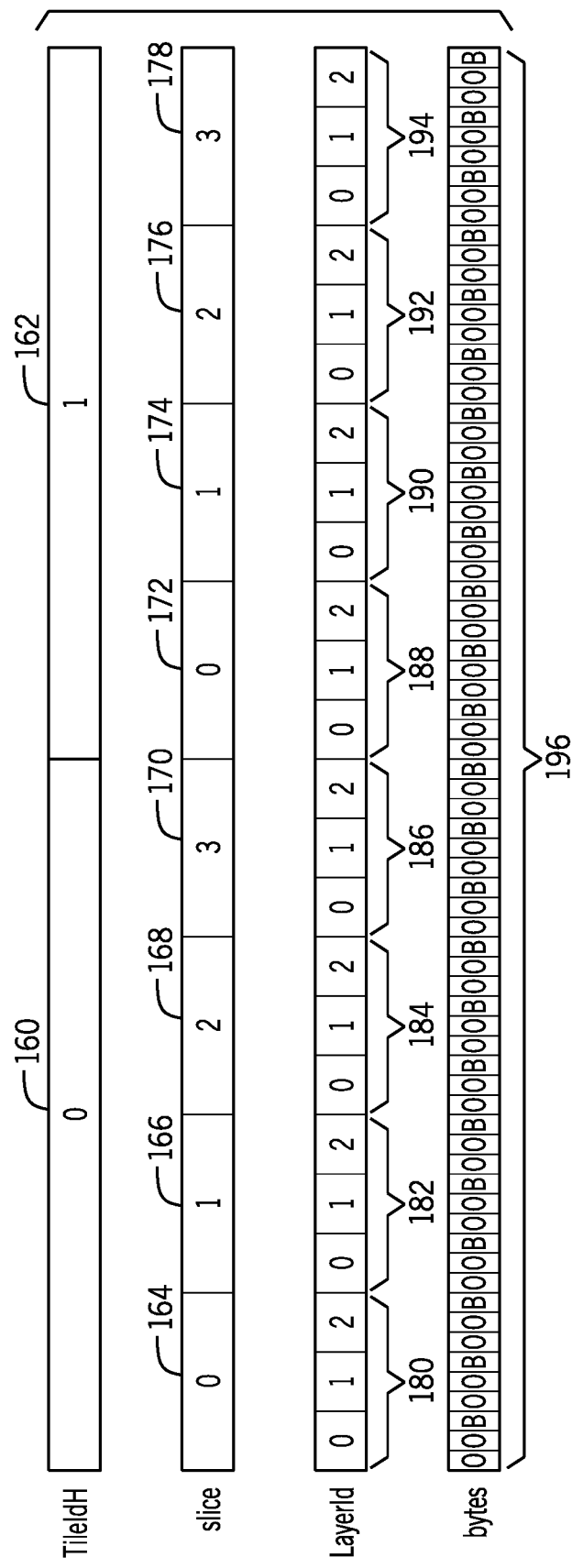
FIG. 12 is a schematic diagram of a compressed strip of image data, in accordance with an embodiment.

With the foregoing in mind, FIG. 12 is a schematic diagram of an encoded compressed strip with three layers, in accordance with an embodiment of the present disclosure. Each encoded tile 160, 162 may include 4 slices per tile 164, 166, 168, 170, 172, 174, 176, 178 with three layers 180, 182, 184, 186, 188, 190, 192, 194 within each of the four slices 164, 166, 168, 170, 172, 174, 176, 178. Each layer may correspond to three bytes 196. Each compressed strip may be encoded with two tiles 160 162 in the horizontal direction with four slices per tile and 3 layers per slice. During each encoding cycle up to 16 bytes 196 may be sent out. The number of bytes 196 per layer may correspond to the slice size. The encoded layers may be assembled into a single slice, and then may be sent to the core for decoding. The header will be constructed based on the layers. Each slice may also include coefficients that may be encoded by the video encoder.

Figure 13:
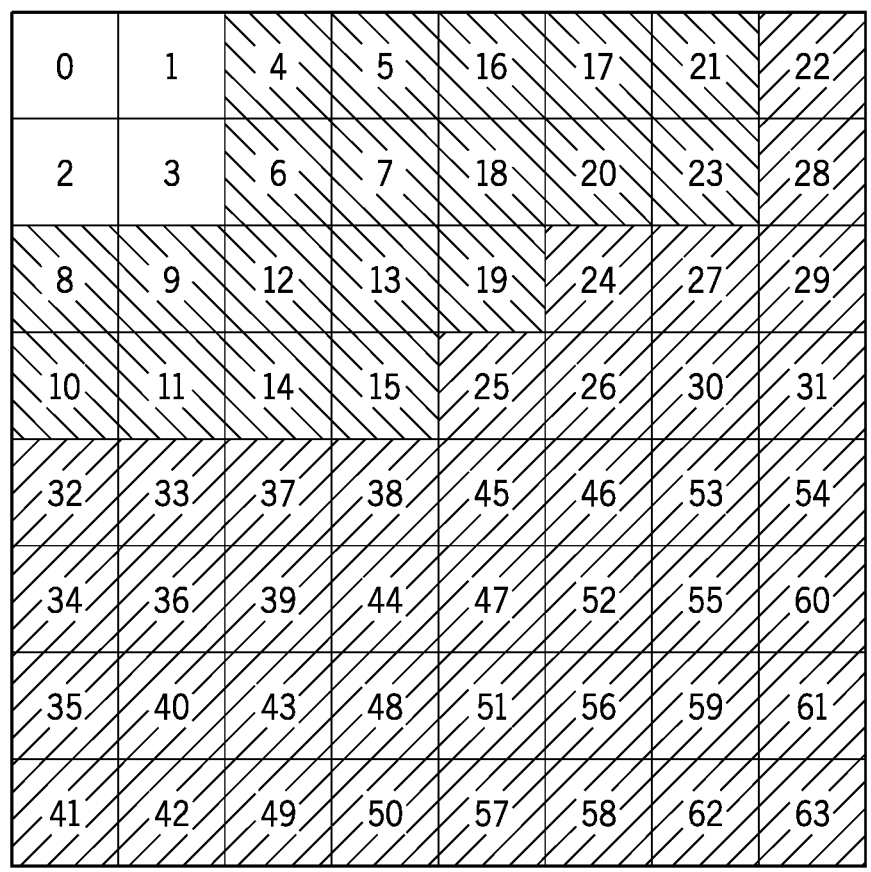
FIG. 13 is a schematic diagram of a first example of scanned quantized DCT coefficients distributed in partitions, in accordance with an embodiment.

With the foregoing in mind, FIG. 13 is a diagram of a first example of scanned quantized DCT coefficients distributed in partitions. The partitions may each correspond to coefficients of the scanned quantized DCT coefficient block 200. For example, layer 0 202 could include 4 coefficients (e.g., 0-3), layer 1 204 could include 20 coefficients (e.g., 4-23), and layer 2 206 could include 40 coefficients (e.g., 24-63). The quantization matrices may be transmitted on a DMA side channel, and the syntax element within the title header syntax may indicate which quantization matrices may be used for processing.

As discussed above, the electronic device 10 may receive one or more layers corresponding to the quantized DCT coefficient block 200 partitions based on the bandwidth of the electronic device 10. Additionally, the number of coefficients included in the partitions may be variable depending on the run length. For example, if layer 1 did not end with a non-zero element at coefficient 23, the run length may be added to the next non-zero element. The quantization index may be specified in the slice header syntax, and the first DC coefficient and DC coefficient difference syntax elements in the scanned coefficients may only be present in the base layer. This is to ensure that the DC coefficients are sent in the base layer, allowing image data to be preserved even in low bandwidth situations.

Figure 14:
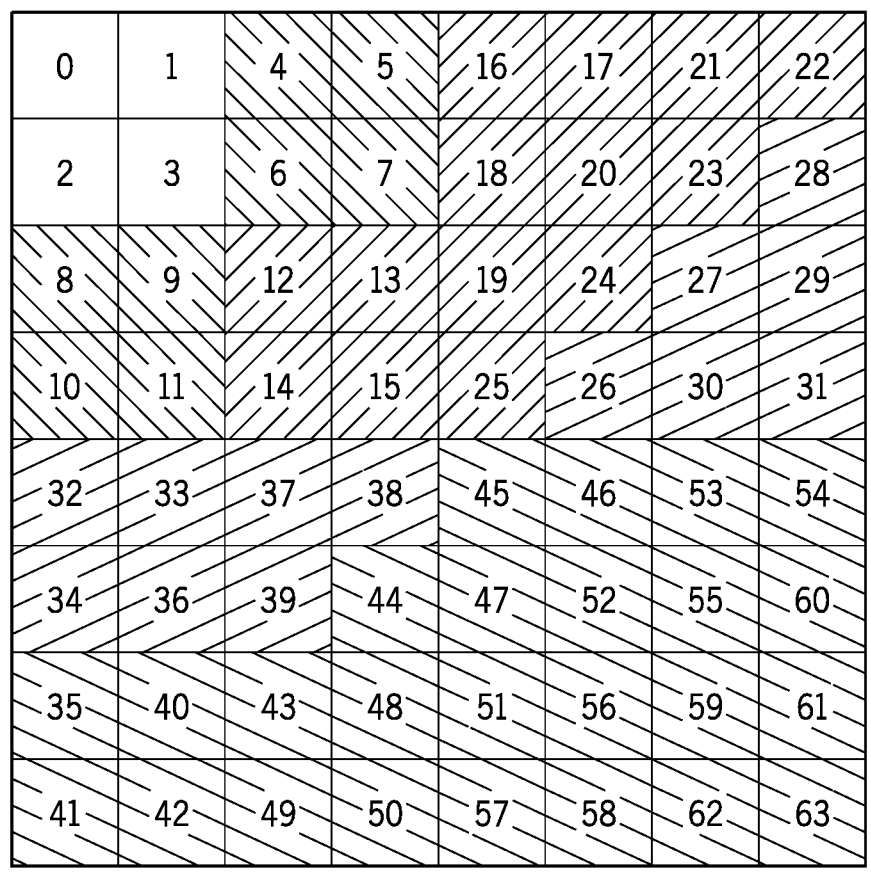
FIG. 14 is a schematic diagram of a second example of scanned quantized DCT coefficients distributed in partitions, in accordance with an embodiment.

Additionally, FIG. 14 is a schematic diagram of a second example of scanned quantized DCT coefficients distributed in partitions. The partitions may each correspond to portions of the scanned quantized DCT coefficient block 207. For example layer 0 could include 4 coefficients (e.g., 0-3) 208, layer 1 could include 8 coefficients (e.g., 4-11) 210, layer 2 could include 12 coefficients (e.g., 12-23) 212, layer 3 could include 16 coefficients (e.g., 24-39) 214, and layer 4 could include 24 coefficients (e.g., 40-63) 216. As discussed above, the electronic device 10 may receive one or more layers corresponding to the quantized DCT coefficient block 200 partitions based on the bandwidth of the electronic device 10. Additionally, the number of coefficients included in the partitions may be variable depending on the run length. The quantization matrices may be transmitted on a side channel, and the syntax element within the title header syntax may indicate which quantization matrices are used. The quantization index specified in the slice header, and the first DC coefficient and DC coefficient difference syntax elements in the scanned coefficients may only be present in the base layer.

Figure 15:
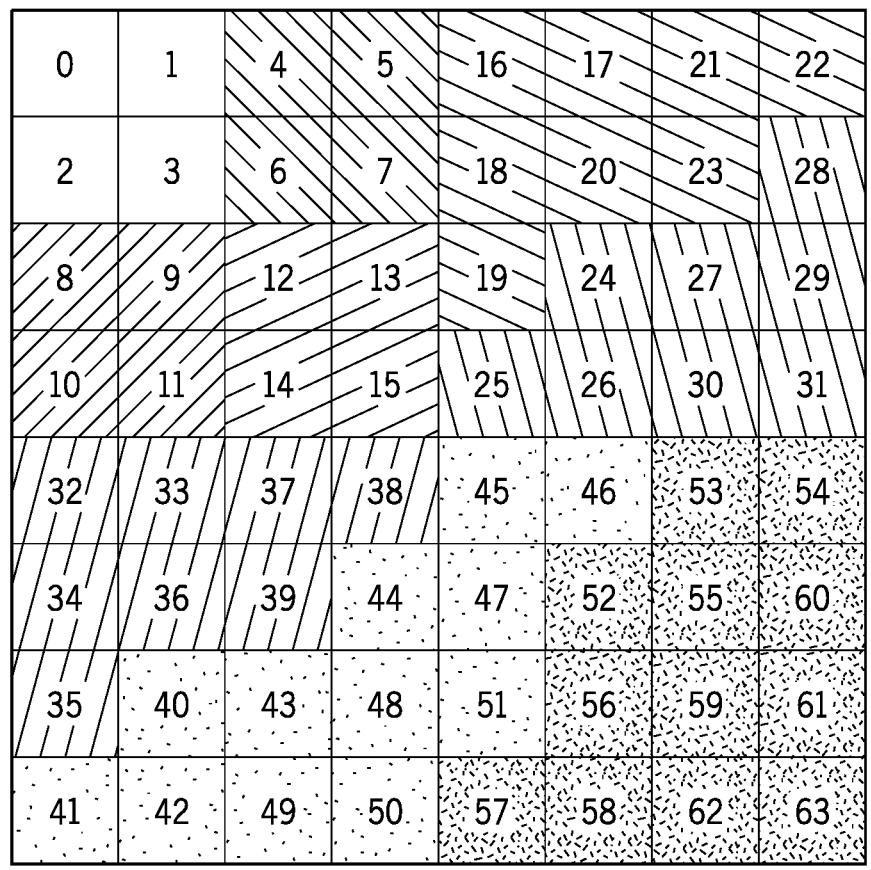
FIG. 15 is a schematic diagram of a third example of scanned quantized DCT coefficients distributed in partitions, in accordance with an embodiment.
Figure 15:
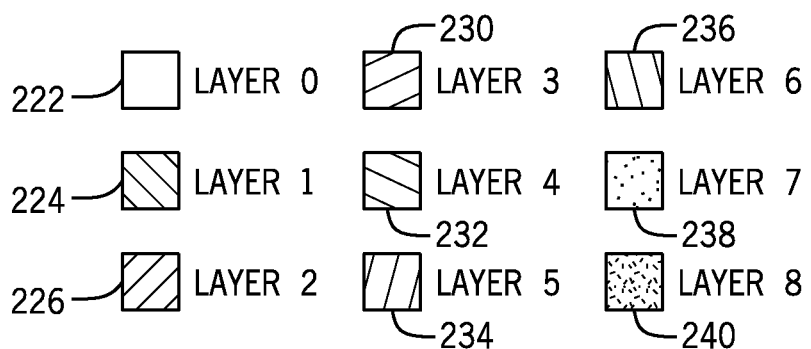

Additionally, FIG. 15 is a diagram is a third example of scanned quantized DCT coefficients distributed in partitions. The partitions may each correspond to portions of the scanned quantized DCT coefficient block 220. For example layer 0 could include 4 coefficients (e.g., 0-3) 222, layer 1 could include 4 coefficients (e.g., 4-7) 224, layer 2 could include 4 coefficients (e.g., 8-11) 226, layer 3 could include 16 coefficients (e.g., 12-15) 230, layer 4 could include 8 coefficients (e.g., 16-23) 232, layer 5 could include 8 coefficients (e.g., 24-31) 234, layer 6 could include 8 coefficients (e.g., 32-39) 236, layer 7 could include 12 coefficients (e.g., 40-51) 238, and layer 8 could include 12 coefficients (e.g., 52-63) 240. As discussed above, the quantization matrices may be transmitted on a side channel, and the syntax element within the title header syntax may indicate which quantization matrices are used. As discussed above, the electronic device 10 may receive one or more layers corresponding to the quantized DCT coefficient block 200 partitions based on the bandwidth of the electronic device 10. Additionally, the number of coefficients included in the partitions may be variable depending on the run length. The quantization index specified in the slice header, and the first DC coefficient and DC coefficient difference syntax elements in the scanned coefficients may only be present in the base layer. It should be understood, that any suitable partition number may be used to partition the scanned quantized DCT coefficient block in addition to the partition examples discussed above.

Figure 16:
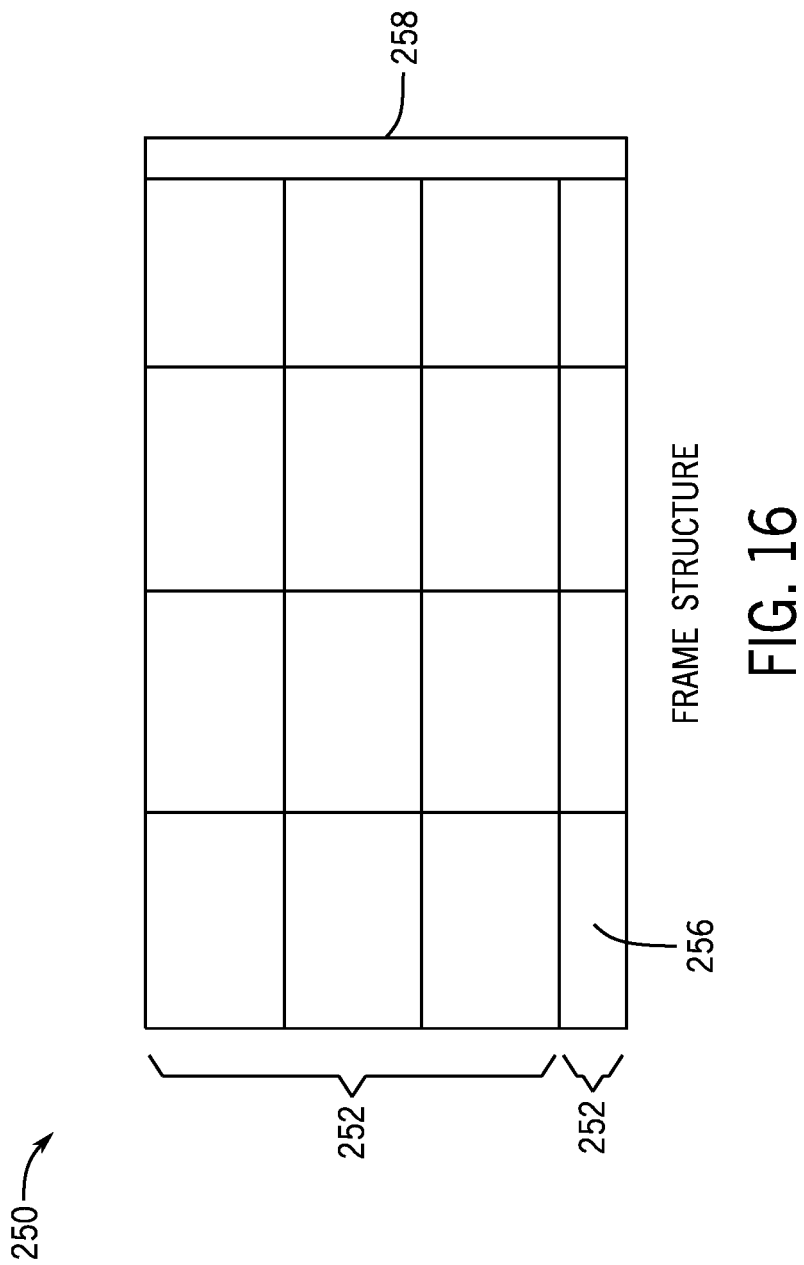
FIG. 16 is a schematic diagram of image frame slice arrangement, in accordance with an embodiment.

With the foregoing in mind, FIG. 16 is a schematic diagram of frame structure arrangement for an encoded image frame 250. The image data corresponding to the picture may be divided into horizontal strips 252 and each horizontal strip 252 may correspond to a height of 4 macroblocks. The macroblocks within the horizontal strip may correspond to a 16×16 array of image pixels. The macroblocks enable the image frame to be divided into up to 64 pixel height strips. The last horizontal strip 254 in the frame may have a variable height of macroblocks depending on the image data. The height of the last horizontal strip 254 may be 1, 2, 3, or 4 macroblocks or any suitable number of macroblocks to correspond to the image data for the last horizontal strip.

The macroblocks may be further divided into blocks which correspond to 8×8 arrays of video component samples. Each respective macroblock may consist of luma and chroma data for the frame. Depending on the ratio of luma to chroma sampling the number of blocks in each macroblock may correspond to different luma and chroma components. For example in a 4:2:2 sampling structure each macroblock may include four Y' (e.g., luma) blocks, two Cb (e.g., blue chroma) blocks, and two Cr (e.g., red chroma) blocks. It should be understood that the macroblock may correspond to any Y'CbCr sampling structure (e.g., 4:4:4, 4:2:0). The horizontal strips may be further split up into tiles 256, wherein the tiles 256 contain slices of image data. The tiles 256 may correspond to horizontal and vertical sizes of the frame that are multiples of 16 pixels (e.g., 4, 8, and 16). The tiles 256 may also be able to accommodate data packets that provide further image frame information. Each tile 256 may include coded slices that include coded layers within the slice. The coded layers include scanned quantized coefficients coded in the layers to allow for data loss depending on layers encoded, and enable built in resolution loss. There may be up to 16 pairs of quantization matrices that can be used for video encoding, and the horizontal strip 252 may use any of the 16 pairs of quantization matrices.

In some embodiments, the width of the horizontal strip 252 may not correspond to a multiple of 8 macroblocks. In such a case, the horizontal strip 252 may then include a single slice 258 at the right edge of the strip to include the remaining 1-7 macroblocks. During encoding, the horizontal strip 252 may be encoded in a vertical (e.g., column order) first, and then coded in a horizontal order. It should be understood that although vertical coding of slices is discussed, conventional raster coding or any suitable coding order may be implemented.

Figure 17:
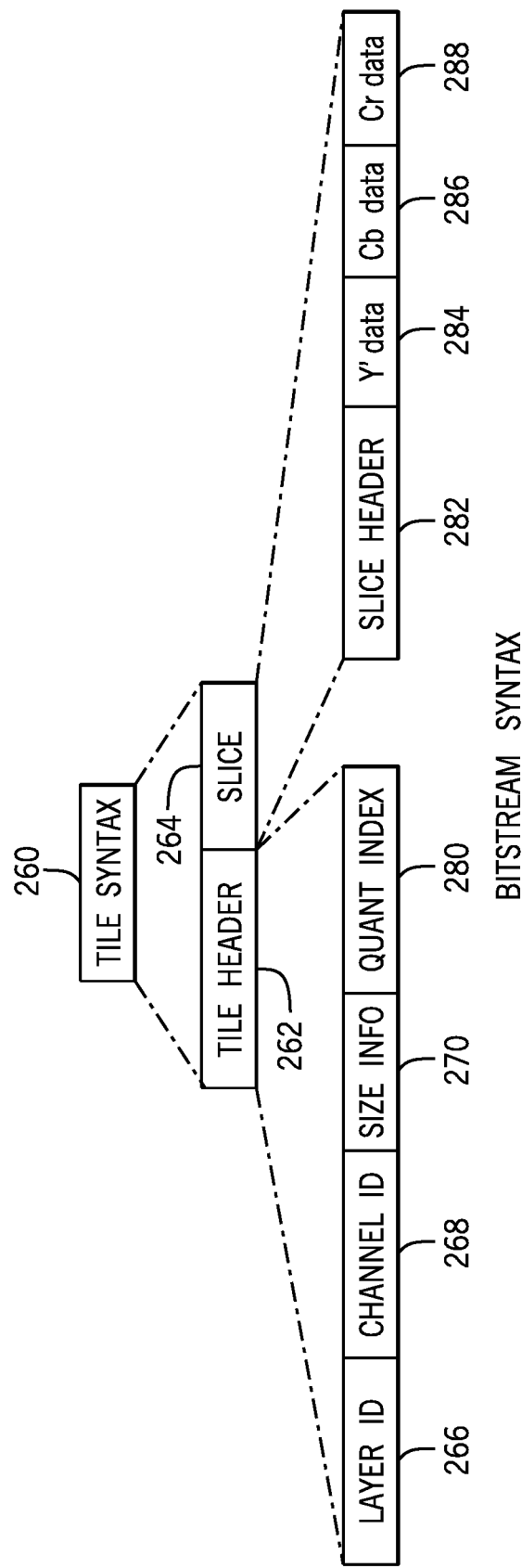
FIG. 17 is a schematic diagram of streaming extension bitstream syntax, in accordance with an embodiment.

With the foregoing in mind, FIG. 17 is an example of the bitstream syntax structure of streaming extensions for the video stream. The syntax elements included in the bitstream are used as parameters to define the compressed image and/or to direct decoding of the bitstream. The bitstream syntax for streaming extensions, which may be employed in the electronic device 10 streaming mode, may include a tile syntax structure 260 which includes multiple syntax structures and elements that define the image frame. The syntax structures and elements included in the tile syntax 260 include the tile header 262 that identifies the base layer and the enhancement layers within the slices encoded in the tile.

The layer ID 266 component of the tile header 262, identifies the layer identifier for the encoded layer, the channel ID 268 identifies the channel information for the video stream, the size information 270 may include the horizontal and vertical size of the tile in macroblock units, and the quantization index 280 may specify the quantization index to use for encoding. The tile syntax 260 may also include slice syntax 264 for the tile. The slice syntax 264 may include a slice header 282 that specifies the number of bits needed to encode the header, the number of coefficient bits needed to encode all the scanned coefficients of the slice, and the luma and chroma bits needed to encode all the scanned coefficients.

The slice syntax 264 may also include luma data 284 which includes the size the luma components in bits due to the variable length field of the luma data based on the layer. The syntax for the Cr and Cb 286, 288 also corresponds to the size of these components in bits, and is a variable length field due to the layer variability. The width of the frame may also be variable and set by the minimum number of bits to encode the slice. The slice header 282 and the scanned coefficients bitstream sections may be concatenated without byte boundary padding, and the slice may only be padded at the end with up to 7 zero bits to enable the slice to be byte aligned.

The luma and chroma sizes are variable length coded (VLC), and correspond to bit sizes rather than traditional byte sizes. The slice header 282 may further include a first DC coefficient and DC coefficient syntax elements in the scanned coefficients component that are present only in the base layer of the data.

The bitstream syntax elements correspond to categories such as fixed-length bit strings, fixed-length numerical values, variable-length codes, and the like. The variable-length codes and bit strings appear in the bitstream left bits first and the numerical values appear with the most-significant bit first. For example, the fixed-length numerical values may correspond to size values designated for the image. The slice syntax 264 as discussed above, may include luma and chroma values that correspond to variable-length codes. The bitstream syntax may employ any combination of syntax elements and categories, such that the image can be decoded according to the decoder capabilities.

During the encoding process, rate control may be implemented to improve visual quality of encoded images. Rate control may be applied during second pass encoding, third pass encoding, or both depending on the device capabilities. Rate control may alter the quantization index used per slice, and the quantization matrix used in subsequent encoding passes. The rate control may implement 3-pass rate control, fixed or adaptive quantization matrix and adaptive dead zone rounding matrix selection, and coefficient masking. The rate control may enable the quantization step size (Qp) of image slices to be adjusted for a given compression ratio to enable sufficient image quality. This enables enhanced image quality by adjusting the Qp of image slices depending on the complexity of the slices.

Figure 18:
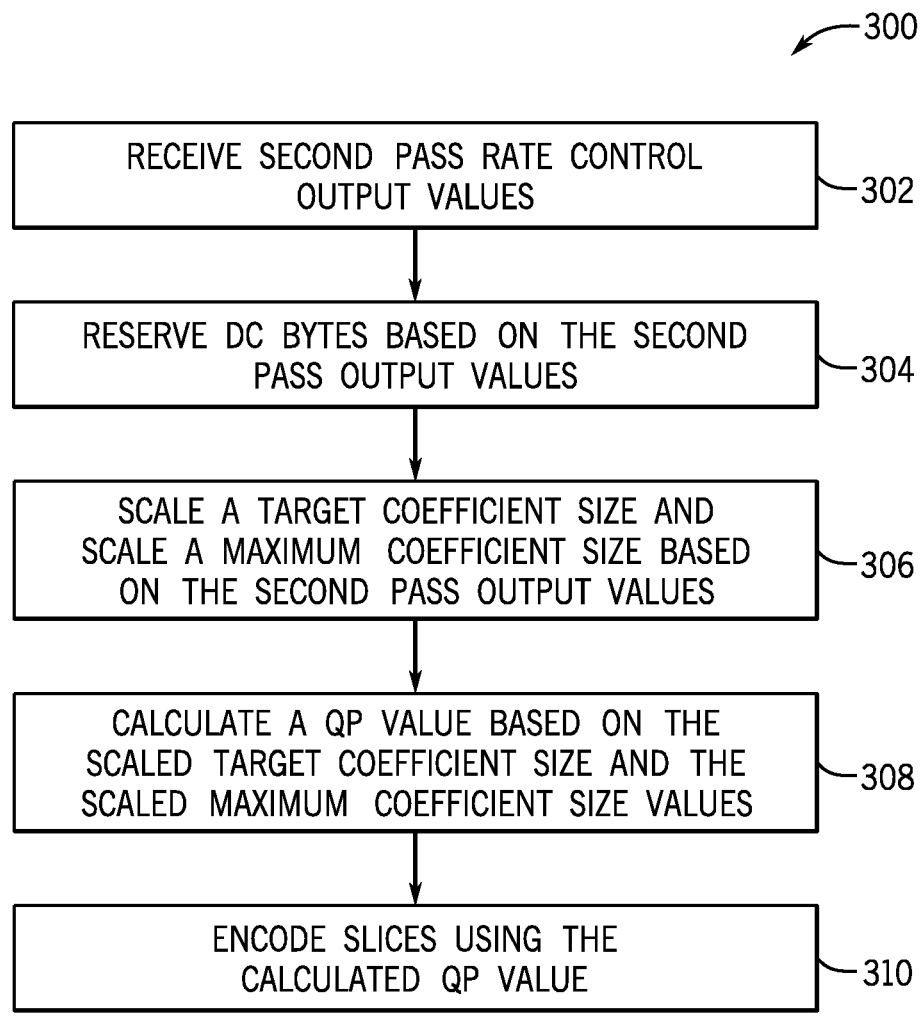
FIG. 18 is a flow diagram of a method of three pass rate control in video encoding, in accordance, in accordance with an embodiment.

With the foregoing in mind, FIG. 18 is a flow diagram of a three-pass method 300 of rate control for video encoding. A video encoder may receive video stream data corresponding to one or more layers, and encode the video stream data in one or more encoding passes. The video encoder may collect statistics from the first pass, second pass, or both and implement the previous pass data to apply rate control to the third pass of video encoding. The first pass of rate control may include determining a size estimation and quantization parameter assignment for each of the one or more image slices, and the second pass of rate control may include further size estimation and updated quantization parameter adjustment based on the first pass results.

Any suitable device (e.g., the microcontroller 52) that may control components of the video encoder, such as the processor 18 (e.g., processor core complex 18), may perform the method 300. In some embodiments, the method 300 may be implemented by executing instructions stored in a tangible, non-transitory, computer-readable medium, such as the memory (e.g., DMA 38), using the processor core complex 18. For example, the method 300 may be performed at least in part by one or more software components, such as an operating system of the video stream provider, one or more software applications of the video stream provider, and the like. While the method 300 is described using steps in a specific sequence, it should be understood that the present disclosure contemplates that the described steps may be performed in different sequences than the sequence illustrated, and certain described steps may be skipped or not performed altogether.

In block 302, the video encoder may receive the second pass rate control output statistics through communication with a companion DMA channel. The statistics may be sent in response to output slices of the second pass encoding exceeding a threshold byte size and the target picture size being below the coded picture size. The threshold used by the encoder to limit the number of bytes generated by the slice component may correspond to 4,096 bytes for video editing, 2,728 bytes for streaming, or any other suitable byte limit amount. The previous slices identified as easy slices (e.g., slices below the threshold slice size) in the second pass rate control may be re-encoded using the second pass quantization index to avoid loss in visual quality, by utilizing the existing quantization index and not the quantization index calculated for difficult slices (e.g., slices above the threshold slice size).

The video encoder at block 304, may determine that the total DC coefficient bytes produced are reserved for the difficult slice target size and the coded picture size. If this cannot be reserved, the rate control continues to the third pass, but may set the target size for each difficult slice (e.g., slices above the threshold slice size) to be the same as the target size for the slice, and implement no ratio adjustments to the target size or maximum size for difficult slices. For calculating the target size of the difficult slices identified in pass two, a ratio between the coded picture size minus the total DC bytes of all slices and the target picture size minus total DC bytes of all slices may be calculated by the processor.

The video encoder may identify the slices that were determined to have a size that exceeds the threshold, and the processor may implement rate control algorithms to encode the difficult slices to a smaller size. The video encoder may assign a target size and a maximum size according to the coded sizes in the second pass to allocate more bits to slices that previously required more bits in the second pass. The sum of the target size for all slices should be within a threshold of the picture target size, and the sum of the maximum size for all slices should be equal to or smaller than the maximum picture size determined. The video encoder, at block 306, may determine a target size of difficult slices based on the second pass results. The target size may be scaled by calculating a ratio of the target coefficient size minus the size of easy slices and the coded coefficient size minus the size of easy slices. The video encoder may also calculate the maximum size of difficult slices, only if the maximum coefficient size for the difficult slices is greater than or equal to the target coefficient size for the difficult slices. The difficult slice size may then be scaled utilizing the ratio of the maximum coefficient size of difficult slice and the target coefficient size of difficult slices and multiplying it by the target slice size.

At block 308, the scaled target slice size and maximum slice size may then be implemented to determine a quantization step size value for encoding the slices, to enable outputting a slice size that is below the threshold slice size. The processor 18 may perform a similar rate control method to the rate control employed during the second pass to calculate the quantization step size. This may involve increasing the quantization step size by 3-fold for slices whose size exceeds the threshold slice size values. The processor 18 implementing the rate control may increase the quantization step size by 3-fold, and the processor 18 may add up slice sizes with the increased quantization step size to estimate a picture size. The slice size estimation is completed by using the sum of the slices header size, bits used for DC coefficients, bits used for AC coefficients, and bits used for levels for AC coefficients.

The 3-fold increase of the quantization step size increases 3-fold until the estimated picture size is below the target picture size. The processor 18 may then use the calculated quantization step size (e.g., Qp) from the three fold increase and the prior quantization step size (e.g., Qp/3) to perform interpolation to calculate the quantization step size implemented for third pass encoding.

At block 310, the video encoder may encode the slices in parallel using the calculated quantization step size and the corresponding calculated quantization matrix to complete encoding of all the slices for the image frame.

In some video encoders, the performance may allow for two passes of video encoding. The video encoding may need to then set a maximum size per slice without the second pass statistics collected during the second pass video encoding. The second pass may implement streaming rate control, when the performance of the video encoder allows for two passes.

Figure 19:
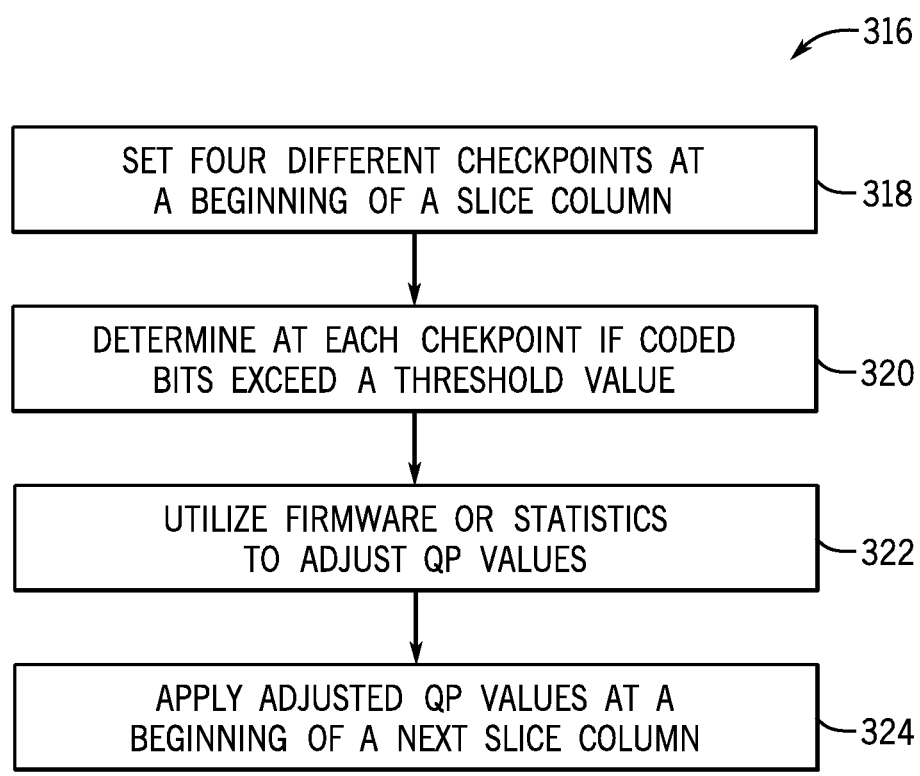
FIG. 19 is a flow diagram of a method of two pass rate control in video encoding, in accordance with an embodiment.

With the foregoing in mind, FIG. 19 is a flow diagram of a method 316 of second pass streaming rate control, in accordance with an embodiment. A video encoder may receive video stream data, and encode the video stream data. The video encoder performance may be limited to two coding passes. The video encoder may implement rate control on the second pass, and may need to perform Qp adjustment and set the maximum slices sizes without having all the second pass statistics.

Any suitable device (e.g., the microcontroller 52) that may control components of the video encoder, such as the processor 18 (e.g., processor core complex 18), may perform the method 316. In some embodiments, the method 316 may be implemented by executing instructions stored in a tangible, non-transitory, computer-readable medium, such as the memory (e.g., DMA 38), using the processor core complex 18. For example, the method 316 may be performed at least in part by one or more software components, such as an operating system of the video stream provider, one or more software applications of the video stream provider, and the like. While the method 316 is described using steps in a specific sequence, it should be understood that the present disclosure contemplates that the described steps may be performed in different sequences than the sequence illustrated, and certain described steps may be skipped or not performed altogether.

In block 318, the video encoder may ensure that a target size of the strip does not exceed a maximum size for the given strip. To implement this adjustment the video encoder may set up four checkpoints at the beginning of a slice column to code. At block 320, the encoder determines that the coded bits exceed the maximum size threshold at a checkpoint, and in response, the maximum size Qp for the previous checkpoint that met the condition is added to each of the following slices Qp. In some embodiments, the maximum size Qp may also be set by the firmware for Qp adjustment. If the Qp is adjusted in the second pass, the Qp may be adjusted using the firmware values. Although in this embodiment checkpoints are established within columns of the image strip, since the strip is a small horizontal portion of image, the same method 316 may be applied to a larger image which may establish checkpoints across rows of the slice instead of columns.

The maximum size may be set by the last slice of the slice column. There may be minimum gaps between checkpoints (e.g., slices) between consecutive columns. This is to enable the pipelines to stay busy, and to correct Qp to accommodate the strip within the maximum size. Thus, the corrected Qp are applied from the first slice of the column, until the next checkpoint. The video encoder may calculate the delta Qp to determine that the coded strip does not exceed the maximum values. As discussed above, in block 322, the video encoder may use firmware to adjust the Qp values. In some embodiments, statistics may be calculated to adjust the Qp values, and the second pass statistics can be implemented to calculate updated Qp values for each slice. The video encoder may track the difference between the estimated maximum complexity of the slices and the actual coding complexity, and may adjust the Qp value based on the ratio between the corrected maximum estimated complexity and the maximum estimated complexity. Additionally, in some embodiments, a maximum size may be allocated to each slice based on the estimated complexity of each slice, and high frequency coefficients may be dropped to limit the size of the slice. At block 324, the Qp, based on the statistical analysis or the firmware, is used to encode the image slices during the second pass and adjustments to Qp are applied at the beginning of the next slice column during the second pass encoding.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. An electronic device comprising:
 a network interface configured to stream image data to another electronic device; and
 video encoder circuitry configured to prepare the image data for streaming according to operations comprising:
  setting checkpoints within a strip of the image data;
  determining whether a size at a checkpoint of the strip of the image data exceeds a threshold size; and
  applying a quantization parameter adjustment at a beginning of a next slice column of the strip based on determining that the size of the strip at the checkpoint exceeds the threshold size.

2. The electronic device of claim 1, wherein the video encoder circuitry is configured to determine, based on image statistics, that the size at the checkpoint of the strip of the image data exceeds the threshold size.

3. The electronic device of claim 1, wherein the video encoder circuitry is configured to prepare the image data for streaming according to operations comprising dropping high frequency coefficients from the strip of the image data in response to the size of the strip exceeding the threshold size at the checkpoint.

4. The electronic device of claim 1, wherein the checkpoints are spaced apart by a minimum gap, wherein the minimum gap is configured to enable the video encoder circuitry to remain operational and to apply the quantization parameter adjustment to accommodate the strip within a maximum size.

5. The electronic device of claim 1, wherein the quantization parameter adjustment is applied from the beginning of the next slice column of the strip to a next checkpoint of the checkpoints.

6. The electronic device of claim 1, wherein the video encoder circuitry is configured to use firmware to perform the quantization parameter adjustment.

7. The electronic device of claim 1, wherein the video encoder circuitry is configured to determine the quantization parameter adjustment based on image statistics.

8. The electronic device of claim 1, wherein the video encoder circuitry is configured to track a difference between an estimated maximum complexity of the strip at the checkpoint and an actual coding complexity as a corrected maximum estimated complexity.

9. The electronic device of claim 8, wherein the video encoder circuitry is configured to determine the quantization parameter adjustment based on a ratio between the corrected maximum estimated complexity and the estimated maximum complexity.

10. A tangible, non-transitory, machine-readable medium comprising instructions that, when executed by a controller of image processing circuitry, causes the image processing circuitry to perform operations comprising:
setting four check points within a strip of image data;
determining if a size at a checkpoint of the strip of image data exceeds a threshold size; and
applying a quantization parameter adjustment at a beginning of a next column based on determining that the size of the strip at the checkpoint exceeds the threshold size.

11. The tangible, non-transitory, machine-readable medium of claim 10, wherein the quantization parameter adjustment comprises quantization parameters provided by firmware.

12. The tangible, non-transitory, machine-readable medium of claim 10, wherein the quantization parameter adjustment comprises scaling a quantization parameter based on a ratio of complexity of the strip of image data.

13. The tangible, non-transitory, machine-readable medium of claim 10, wherein the operations comprise dropping high frequency coefficients from the strip of image data in response to the size of the strip exceeding the threshold size at the checkpoint.

14. The tangible, non-transitory, machine-readable medium of claim 10, wherein the operations comprise calculating a ratio between a corrected maximum estimated complexity of the strip of image data and a maximum estimated complexity based on a previous image encoding pass.

15. The tangible, non-transitory, machine-readable medium of claim 10, wherein the operations comprise encoding only DC bytes of the image data when a maximum size cannot accommodate the DC bytes.

16. A method comprising:
setting, using video encoder circuitry, checkpoints within a strip of image data;
determining, using the video encoder circuitry, whether a size at a checkpoint of the strip of image data exceeds a threshold size; and
applying, using the video encoder circuitry, a quantization parameter adjustment at a beginning of a next slice column of the strip based on determining that the size of the strip at the checkpoint exceeds the threshold size.

17. The method of claim 16, wherein the quantization parameter adjustment comprises quantization parameters provided by firmware.

18. The method of claim 16, wherein the quantization parameter adjustment comprises scaling a quantization parameter based on a ratio of complexity of the strip of image data.

19. The method of claim 16, comprising dropping high frequency coefficients from the strip of image data in response to the size of the strip exceeding the threshold size at the checkpoint.

20. The method of claim 16, comprising calculating a ratio between a corrected maximum estimated complexity of the strip of image data and a maximum estimated complexity based on a previous image encoding pass.

* * * * *